US008316297B2

United States Patent
Grimm et al.

(10) Patent No.: US 8,316,297 B2
(45) Date of Patent: Nov. 20, 2012

(54) METHOD FOR PROVIDING COMPREHENSIVE DOCUMENTATION INFORMATION OF COMPLEX MACHINES AND SYSTEMS, IN PARTICULAR AN INJECTION MOLDING MACHINE

(75) Inventors: Günther Grimm, Winterstrasse (DE); Markus Betsche, Rosenheim (DE); Herbert Pickel, Planegg (DE)

(73) Assignee: KraussMaffei GmbH, München (DE)

(*) Notice: Subject to any disclaimer, the term of this patent is extended or adjusted under 35 U.S.C. 154(b) by 816 days.

(21) Appl. No.: 11/857,009

(22) Filed: Sep. 18, 2007

(65) Prior Publication Data

US 2008/0021678 A1 Jan. 24, 2008

Related U.S. Application Data

(63) Continuation of application No. PCT/EP2006/060781, filed on Mar. 16, 2006.

(30) Foreign Application Priority Data

Apr. 1, 2005 (DE) .......................... 10 2005 014 941

(51) Int. Cl.
G06F 17/21 (2006.01)
(52) U.S. Cl. ...................................... 715/273
(58) Field of Classification Search .................. 715/273
See application file for complete search history.

(56) References Cited

U.S. PATENT DOCUMENTS

| 7,525,430 B2* | 4/2009 | Nakamura et al. ......... 340/572.1 |
| 2001/0047370 A1* | 11/2001 | Sekitani ........................ 707/500 |
| 2004/0172587 A1* | 9/2004 | Lawlor .......................... 715/500 |
| 2005/0178821 A1* | 8/2005 | Ono et al. ..................... 235/375 |

FOREIGN PATENT DOCUMENTS

| DE | 196 10 637 | 9/1997 |
| DE | 197 44 443 | 10/1998 |
| DE | 199 53 739 | 7/2001 |
| DE | 101 23 796 | 11/2002 |
| WO | WO 02/04 186 | 1/2002 |
| WO | WO 2004/076 143 | 9/2004 |

* cited by examiner

*Primary Examiner* — Laurie Ries
*Assistant Examiner* — Tionna Smith
(74) *Attorney, Agent, or Firm* — Henry M. Feiereisen, LLC

(57) ABSTRACT

A method for providing comprehensive documentation information of complex machines and systems, in particular an injection molding machine is disclosed. Each of the machine components has a storage device that stores information specific for the machine component; in addition, an individual identification is assigned to each of the machine parts. An overall documentation of the machine is generated by combining the component-specific information from a first documentation memory and the part-specific information from a second documentation memory. The overall documentation is displayed on an output device to allow an operator to determine an up-to-date machine configuration and machine state and to intervene in operation and maintenance of the machine.

20 Claims, 2 Drawing Sheets

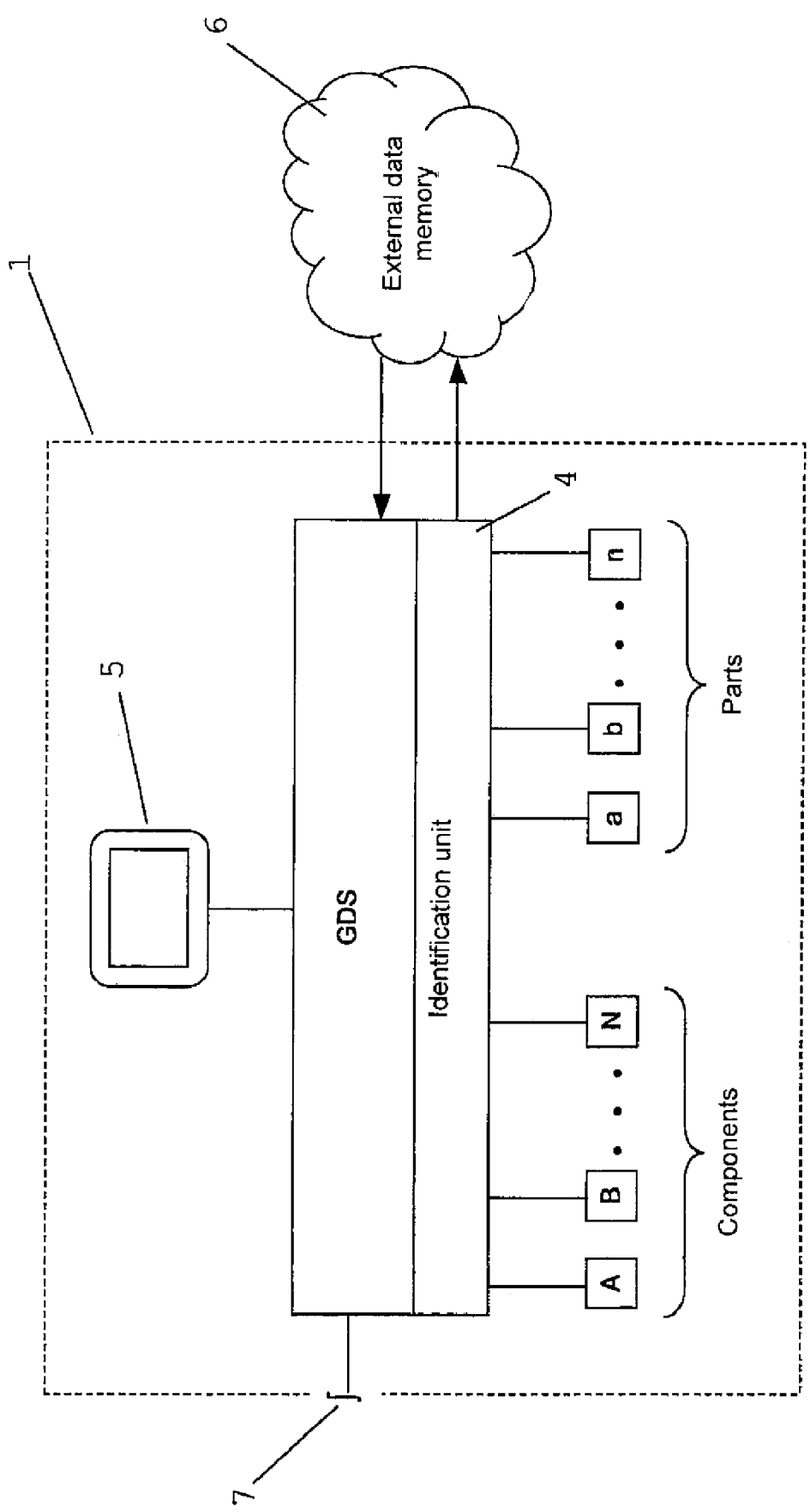

METHOD FOR PROVIDING COMPREHENSIVE DOCUMENTATION INFORMATION OF COMPLEX MACHINES AND SYSTEMS, IN PARTICULAR AN INJECTION MOLDING MACHINE

CROSS-REFERENCES TO RELATED APPLICATIONS

This application is a continuation of prior filed copending PCT International application no. PCT/EP2006/060781, filed Mar. 16, 2006, which designated the United States and has been published but not in English as International Publication No. WO 2006110318O and on which priority is claimed under 35 U.S.C. §120 and which claims the priority of German Patent Application, Ser. No. 102005014941.3, filed Apr. 1, 2005, pursuant to 35 U.S.C. 119(a)-(d), the contents of which are incorporated herein by reference in its entirety as if fully set forth herein.

BACKGROUND OF THE INVENTION

The present invention is directed to a method for providing comprehensive documentation information of complex machines and systems, in particular an injection molding machine.

Nothing in the following discussion of the state of the art is to be construed as an admission of prior art.

Documentation information of complex machines and systems is provided by a manufacturer in form of operating manuals, exploded view drawings, replacement part lists and the like, either on paper (hardcopy) or in electronic form, e.g., on a data carrier. At the time the machine/system is delivered, the manufacturer makes sure that the status of the documentation agrees with the status of the delivered machine. The customer can use the documentation from the data carrier or from the hardcopy.

Disadvantageously, the manufacturer of, for example, modularly constructed machines and systems incurs significant expenses to combine the various parts of the documentation for the individual modules to an overall documentation which corresponds exactly to the delivered machine. It is also disadvantageous that the desired documentation documents are typically provided to the end customer separate from the machine/system, so that the end customer incurs costs for acquiring the machine/system documentation. It is also disadvantageous that, for example, when a replacement part or replacement component is installed, the new components may be modified or improved, which is not illustrated in the original supplied documentation data. This frequently leads to an erroneous fault analysis during maintenance of the machine/system.

It would therefore be desirable and advantageous to provide an improved comprehensive documentation information in a complex machine/system, in particular an injection molding machine to obviate prior art shortcomings

SUMMARY OF THE INVENTION

To ensure clarity, it is necessary to establish the definition of several important terms and expressions that will be used throughout this disclosure. The terms "components" and "parts" of complex systems have different meanings. The term "part" applies herein to a system module constructed of several individual parts and has a readable memory unit, e.g., a chip or a hard disk, on which component-specific documentation information is saved. Suitably, a component has an interface adapted to connect the component to a central documentation memory of the system.

The term "part" applies to a small system module or a small individual part, which is not adapted to be equipped with a memory unit, e.g., a chip or a hard disk. According to the invention, small components of this type or individual parts are provided with identification information, for example in form of a barcode, by which the "part" can be unambiguously identified.

According to one aspect of the invention, a method of ascertaining a configuration and a state of a machine, wherein the machine comprises a plurality of exchangeable machine components and parts, includes the steps of providing each of the machine components with a storage device that stores information specific for the machine component, assigning an individual identification to each of the machine parts; accessing the storage device of each machine component to retrieve the component-specific information, storing the component-specific information in a first documentation memory, reading the identification of each machine part into an identification unit accessing with the identification unit an external memory to retrieve information associated with the identification of each machine part, storing the part-specific information in a second documentation memory, combining the component-specific information from the first documentation memory and the part-specific information from the second documentation memory to generate an overall documentation of the machine, and displaying the overall documentation in an output device to allow an operator to determine the machine configuration and machine state and to intervene in operation and maintenance of the machine.

According to another aspect of the invention, a method of ascertaining a configuration and a state of a machine, wherein the machine comprises a plurality of exchangeable machine components and parts, includes the steps of providing each of the machine components with component-specific information and each of the machine parts with part-specific information, reading the component-specific information and part-specific information into an identification unit, reading with the identification unit component-specific and part-specific documentation information from an external data memory into an overall documentation memory, generating from the component-specific and part-specific documentation information an overall documentation of the system, and displaying the overall documentation on an output device to allow an operator to determine the machine configuration and machine state and to intervene in operation and maintenance of the machine. In this modification of the method of the invention, there is not necessarily a differentiation between components and parts which reduces the design complexity, as only the identification information may have to be attached to the component which can be implemented, for example, by a barcode sticker.

Embodiments of the invention may include one or more of the following features. The external data memory may be provided on the Internet, on an intranet or on a data carrier, for example, a CD-ROM, a DVD-ROM, or a combination thereof. The identification information in the identification unit may be encoded, for example, in form of a barcode. Suitably, the overall documentation may be provided to a manufacturer of the machine via an interface, for example, a remote query interface.

According to another feature of the present invention, the component-specific documentation information of a replacement component may be read into the first documentation memory after a component has been exchanged, and a changed overall documentation may be generated from the changed documentation information. In yet another embodiment, the part-specific identification information may be read with the help of the identification unit after a component has been exchanged, wherein the identification unit reads at least the part-specific documentation information of the replacement part from the external data memory into the second documentation memory, and generates from the changed documentation information a changed overall documentation. In this way, changed and updated overall documentation can be provided to the user even after, for example, a component has been exchanged for a modified and updated replacement component.

Having an updated overall documentation of the complex system allows the manufacturer of the complex system to interrogate the up-to-date configuration of the components and parts of the system and assist the operator of the system, e.g., the injection molding machines, with the operation and/or the repair with additional information. This eliminates the risk that the operator of the system and the manufacturer of this system base their decisions on different states of the system.

The documentation information of the components may include an exploded view drawing, a replacement part list, technical data, characteristic curves, limit values relating to a load, and/or data about a maximally permissible load cycle of a component. The documentation may also include data logs of the operating state, wear values, data relating to the service life, data relating to maintenance intervals, manufacturing data, and/or information about permissible and historic control deviations. The documentation information may further include wiring diagrams, operating information, information about settings, process parameters and/or maintenance information for at least one of the components and the parts. This information may be provided in different languages or in a combination of languages.

In accordance with the present invention, comprehensive documentation information is provided in a complex machine/system, in particular an injection molding machine, which ensures that the user of the machine always has an available up-to-date documentation information that is correct and up-to-date for the particular machine.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 shows in form of a block diagram a second embodiment of the method of the invention.

DETAILED DESCRIPTION OF PREFERRED EMBODIMENTS

Figure 1:
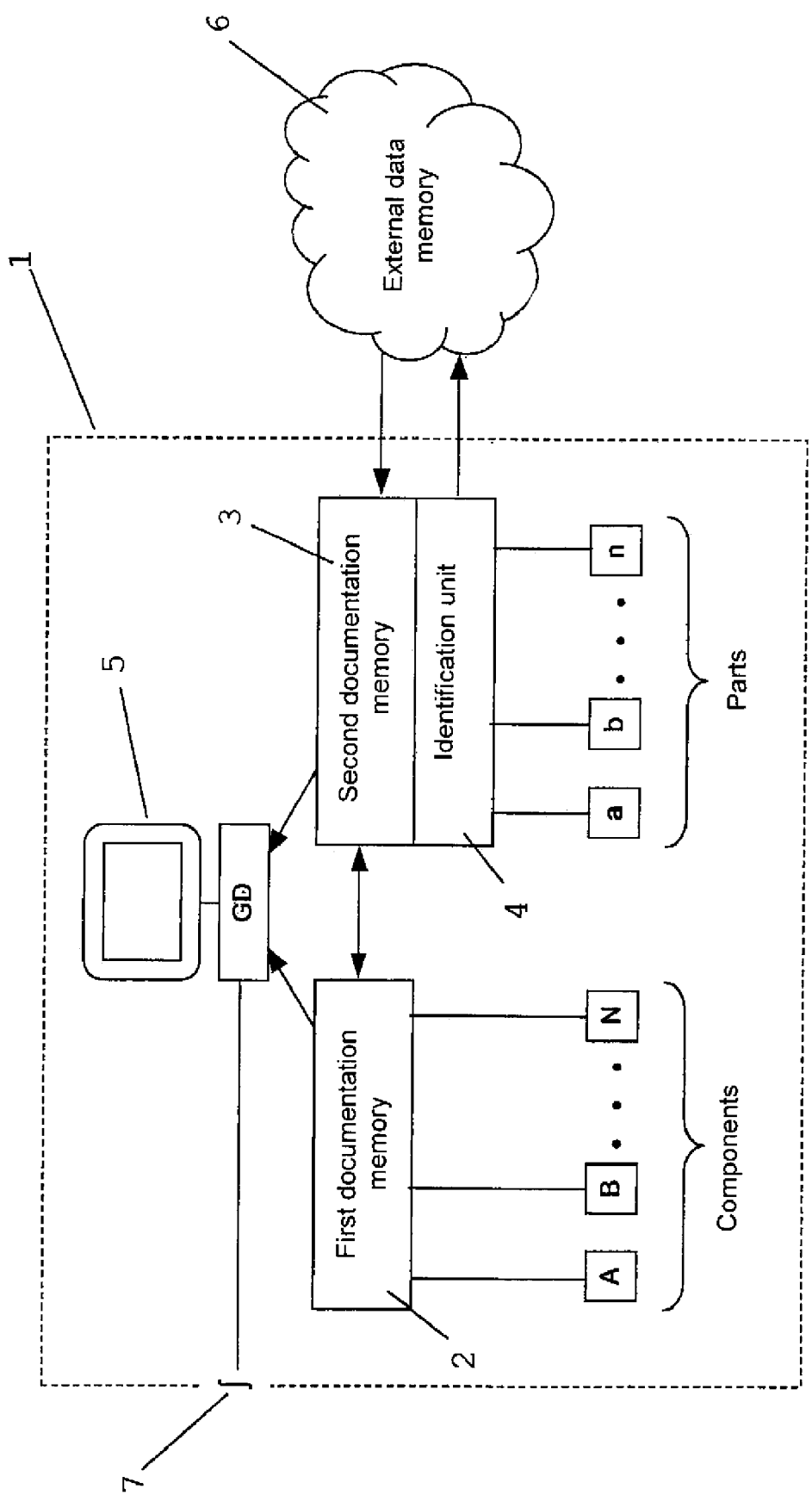
FIG. 1 shows schematically in form of a block diagram a first embodiment of the method of the invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a first embodiment of the method of the invention. A system 1, e.g., an injection molding machine, includes a first documentation memory 2, a second documentation memory 3, and an identification unit 4. Also provided is an output device 5 adapted to output documentation information of an overall documentation GD of the complex system 1. The overall documentation GD is composed of information of the first documentation memory 2 and the second documentation memory 3. The first documentation memory 2 is operatively connected with the components A, B, . . . N, wherein the components A, B, . . . N include memory units, e.g., chips or hard disks, on which documentation information relating to the respective component A, B, . . . N is stored.

Smaller modules or smaller parts of the machine, in the following referred to as "parts" a, b, . . . n, of the complex system 1 include identification information, e.g., in form of a barcode sticker or other types of identification information and are operatively connected with the identification unit 4. The identification unit 4 can read the identification information of the parts a, b, . . . n and access an external data memory 6 where up-to-date documentation information relating to the parts a, b, . . . n and specific for each part is stored. The external data memory may be, for example, a data carrier supplied with a subscription, for example a CD or a DVD. The required documentation information for the "parts" can also be stored in a database accessible on an intranet or on the Internet. Based on the identification information, the up-to-date part-specific documentation information is read from the external data memory 6 into the second documentation memory 3. As a result, up-to-date component-specific documentation information for all components of the complex system is available in the first documentation memory 2. Updated part-specific documentation information is available in this documentation memory 3 for all parts a, b, . . . n.

An overall documentation GD is formed from this totality of documentation information of all relevant components and parts of the complex system. A user of the complex system, for example the injection molding machine, can access the information of the overall documentation GD via an output device 5.

The overall documentation GD includes an interface 7, for example a remote query interface, which can be used by the manufacturer of a complex system to access the system-specific overall documentation at the operator of a complex system, for example, for supporting maintenance and service functionality. In this way, the operator can receive effective optimized and machine-specific support from the manufacturer.

A second embodiment of the method of the invention is illustrated in FIG. 2. Unlike with the method depicted in FIG. 1, all components A, B, . . . N and all parts a, b, . . . n only include identification information and are connected with the identification unit 4 of the complex system 1. The complete documentation information of all components and parts is provided in the external data memory 6, with the identification unit calling the part-specific and component-specific documentation information from the external data memory based on the identification of the components and parts, and reading this documentation information into an overall documentation memory GDS. The overall documentation GD in the overall documentation memory GDS is in turn connected with an output device 6, so that the user of the complex system 1 is provided with an up-to-date, machine-specific system documentation.

In accordance with the present invention, the overall documentation information can also be provided to the manufacturer of the complex system via an interface 7, in particular a remote query interface, so as to optimize and improve, as already mentioned above, the customer service from the manufacturer.

In the following, an exemplary exchange of a component or a part is described for both embodiments of the method of the invention depicted in FIG. 1 and FIG. 2.

When a component A, B, . . . N is exchanged for a replacement component A', B', . . . N' according to the method of FIG. 1, documentation information is read from the storage unit of the replacement component A', B', . . . N' into the documentation memory 2 after the replacement component A', B', . . . N' has been installed In this way, the documentation memory 2 is updated so as to reflect the potentially changed documentation information resulting from the installation of the replacement component A', B', . . . N'.

If a part a, b, . . . n is exchanged for a replacement part a', b', . . . n', then the type of the replacement part is determined with the identification unit 4 after the replacement part a', b', . . . n' has been installed. Thereafter, documentation information about this replacement part a', b', . . . n' is recalled from the external data memory 6 and read into the second documentation memory 3. As a result, the documentation memory 3 is also updated to reflect the parts actually installed in the complex system 1. After the documentation memory 2 or the documentation memory 3 or both documentation memories 2, 3 have been updated, an up-to-date overall documentation GD specific for this machine is generated from the documentation information of both documentation memories 2, 3, and this overall documentation GD is provided to the output device 5.

In the embodiment according to FIG. 2 of the method of the invention, after a component A, B, . . . N or a part a, b, . . . n has been exchanged with a replacement component A', B', . . . N' or a replacement part a', b', . . . n', this replacement component or part is identified by the identification unit 4. Thereafter, the documentation information corresponding to the replacement component A', B', . . . N' or the replacement part a', b', . . . n' is recalled from the external data memory 6 and read into the overall documentation GD. As a result, the overall documentation GD is updated machine-specific following the installation of a replacement component A', B', . . . N' or a replacement part a', b', . . . n'.

The overall documentation GD can be integrated, for example, with a machine controller, wherein the machine controller is electronically connected with the components and capable of evaluating a documentation or the technical data of the components/parts and optionally display the evaluated technical data of the components/parts on the display screen. The components/parts can be connected with the documentation memories and/or the identification unit and/or the machine controller, for example, via cable, wireless, optical links, magnetism, etc.

The machine controller and/or the overall documentation GD can administer and update itself automatically, so that the documentation is automatically updated, in particular during a subsequent components/parts exchange. Updated documentation is always available on the complex system and need not be centrally administered and/or provided. An exemplary component is a hydraulic pump of an injection molding machine with control electronics that includes a memory unit, in which exploded views, replacement part lists, technical data such as characteristic curves, limit values, etc., are stored. The electronics/memory unit is connected via a bus system with the supervisory machine controller of the complex system, e.g., the injection molding machine, which can recall, process and visualize these data.

In the electronics or the memory unit of, for example, a pressure sensor, additional values for permissible load cycles, for example a maximum value, are stored by the manufacturer and the sensor counts the number of load cycles observed during operation. This makes possible a load- and cycle-dependent service life forecast, and a forecast of the failure probability. This facilitates preventive maintenance.

Additional data that can be stored in the memory unit of a component or in the external memory for components and/or parts are, for example:

Limit values (maximum/minimum values), logs of characteristic curves in the operating state, wear data, service life data, maintenance interval, manufacturing data, permissible and actual control deviations, etc.

It will be understood that the method of the invention according to FIG. 1 and FIG. 2 can be used to integrate additional peripheral devices, for example an injection molding tool, handling units for workpieces and the like, conveyor belts, annealing units, heating cabinets, or tool change systems.

The invention also makes it possible to store, update and document in the injection molding tool, for example, wiring diagrams, operating instructions, settings, process parameters, maintenance information, etc.

In accordance with the invention, the documentation matches at any time the corresponding machine-specific and up-to-date machine or system configuration. This enables plug-and-play service and plug-and-play updating of the documentation. This is a prerequisite for a reliable remote diagnostic, for example, via the remote query interface, via a PC connection for the manufacturer. This provides for both the manufacturer and the operator reliable end-to-end documentation as well as time and cost savings for generating the documentation. In addition, the operator can correctly and machine-specifically implement support measures communicated by the manufacturer.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of ascertaining a configuration and a state of a machine, wherein the machine comprises a plurality of exchangeable machine components and parts, said method comprising the steps of:

providing each of the machine components with a dedicated storage device arranged on the machine component that stores documentation information specific for the machine component;

assigning an individual identification information to each of the machine parts;

accessing the storage device of each machine component to retrieve the component-specific documentation information;

storing the component-specific documentation information in a first documentation memory;

reading the identification information of each machine part into an identification unit;

accessing with the identification unit an external memory to retrieve documentation information associated with the identification information of each machine part;

storing the retrieved part-specific documentation information in a second documentation memory;

combining the component-specific documentation information from the first documentation memory and the retrieved part-specific identification information from the second documentation memory to generate an overall documentation of the machine;

upon exchange of a machine component with a replacement machine component, reading into the first documentation memory changed component-specific documentation information of a replacement machine component stored in the dedicated storage device arranged on the replacement machine component, and reading with the identification unit at least the part-specific documentation information of the replacement part from the external data memory into the second documentation memory, automatically generating from changed documentation information in the first and second documentation memory a changed overall documentation, and displaying at least the changed overall documentation on an output device to allow an operator to determine the changed machine configuration and machine state and to intervene in operation and maintenance of the machine.

2. The method of claim 1, wherein the external data memory is provided on the Internet, on an intranet or on a data carrier, a CD-ROM, a DVD-ROM, or a combination thereof.

3. The method of claim 1, wherein at least one of the component-specific documentation information and the part-specific identification information is encoded.

4. The method of claim 3, wherein the identification information is encoded as a barcode.

5. The method of claim 1, further comprising the step of providing the overall documentation to a manufacturer of the machine via an interface.

6. The method of claim 5, wherein the interface comprises a remote query interface.

7. The method of claim 1, wherein the documentation information of the components comprises an exploded view drawing, a replacement part list, technical data, characteristic curves, limit values relating to a load, data about a maximally permissible load cycle of a component, or a combination thereof.

8. The method of claim 1, wherein the documentation information includes at least one of data logs of the operating state, wear values, data relating to the service life, data relating to maintenance intervals, manufacturing data, and information about permissible and historic control deviations.

9. The method of claim 1, wherein the documentation information includes wiring diagrams, operating information, information about settings, process parameters or maintenance information for at least one of the components and the parts.

10. The method of claim 1, wherein the documentation information is provided in different languages or in a combination of languages.

11. A method of ascertaining a configuration and a state of a machine, wherein the machine comprises a plurality of exchangeable machine components and parts, the method comprising the steps of:

providing each of the machine components with component-specific identification information and each of the machine parts with part-specific identification information;

reading the component-specific identification information and the part-specific identification information from the respective machine component or the respective machine part, or both, into an identification unit;

reading with the identification unit component-specific and part-specific documentation information from an external data memory into an overall documentation memory;

automatically generating from the component-specific and part-specific documentation information an overall documentation of the system;

upon exchange of a machine component with a replacement machine component, reading into the identification unit changed component-specific identification information of a replacement machine component, and reading with the identification unit changed component-specific and part-specific documentation information of the replacement part from the external data memory into the overall documentation memory, automatically generating from the changed documentation information a changed overall documentation, and displaying at least the changed overall documentation on an output device to allow an operator to determine the changed machine configuration and machine state and to intervene in operation and maintenance of the machine.

12. The method of claim 11, wherein the external data memory is provided on the Internet, on an intranet or on a data carrier, a CD-ROM, a DVD-ROM, or a combination thereof.

13. The method of claim 11, wherein at least one of the component-specific identification information and the part-specific identification information is encoded.

14. The method of claim 13, wherein the identification information is encoded as a barcode.

15. The method of claim 11, further comprising the step of providing the overall documentation to a manufacturer of the machine via an interface.

16. The method of claim 15, wherein the interface comprises a remote query interface.

17. The method of claim 15, wherein the component-specific documentation information comprises an exploded view drawing, a replacement part list, technical data, characteristic curves, limit values relating to a load, data about a maximally permissible load cycle of a component, or a combination thereof.

18. The method of claim 15, wherein the component-specific and part-specific documentation information includes at least one of data logs of the operating state, wear values, data relating to the service life, data relating to maintenance intervals, manufacturing data, and information about permissible and historic control deviations.

19. The method of claim 11, wherein the component-specific and part-specific documentation information includes wiring diagrams, operating information, information about settings, process parameters or maintenance information for at least one of the components and the parts.

20. The method of claim 11, wherein the component-specific and part-specific documentation information is provided in different languages or in a combination of languages.

* * * * *